United States Patent [19]

Watanabe et al.

[11] Patent Number: 4,585,389

[45] Date of Patent: Apr. 29, 1986

[54] APPARATUS FOR LOADING OR UNLOADING A WORKPIECE

[75] Inventors: Masao Watanabe, Nagoya; Hideo Nagakura, Okazaki; Taminori Yanagisawa, Toyota, all of Japan

[73] Assignee: Toyota Jidosha Kabushiki Kaisha, Japan

[21] Appl. No.: 629,573

[22] Filed: Jul. 11, 1984

[30] Foreign Application Priority Data

Aug. 1, 1983 [JP] Japan ................. 58-140669

[51] Int. Cl.$^4$ .............................. B23Q 7/04
[52] U.S. Cl. .................... 414/752; 74/569; 414/737; 414/917; 414/225
[58] Field of Search ............. 414/222, 225, 226, 749, 414/917, 733, 737, 738, 739, 740, 741, 750, 752, 753, 751, 626, 706, 729, 730; 100/207, 215; 248/324, 325; 74/569; 72/419, 426

[56] References Cited

U.S. PATENT DOCUMENTS

| | | | |
|---|---|---|---|
| 1,766,573 | 6/1930 | Westin | 414/733 |
| 2,061,358 | 11/1936 | Hunter et al. | 414/917 X |
| 2,948,417 | 8/1960 | Haanes | 414/733 |
| 3,061,118 | 10/1962 | Halberstadt | 414/917 X |
| 3,209,922 | 10/1965 | Melvin | 414/740 X |
| 3,709,377 | 1/1973 | Sturm et al. | 414/739 |
| 3,902,606 | 9/1975 | Rönbeck | 414/733 |
| 4,096,953 | 6/1978 | Kellermann et al. | 414/917 X |
| 4,400,984 | 8/1983 | Rönbeck | 414/749 X |
| 4,411,587 | 10/1983 | Niui | 414/917 X |

FOREIGN PATENT DOCUMENTS

| | | |
|---|---|---|
| 56103026 | 8/1911 | Japan . |
| 46-34158 | 10/1971 | Japan . |
| 589239 | 7/1981 | Japan . |
| 56-49655 | 11/1981 | Japan . |
| 58-328 | 1/1983 | Japan . |

Primary Examiner—Frank E. Werner
Attorney, Agent, or Firm—Parkhurst & Oliff

[57] ABSTRACT

An apparatus for loading or unloading a workpiece to be pressed by a press machine. The equipment has cam grooves for a work motion and a return motion, on which a pin is mounted to contact with the biasing force of a cylinder device. The pin is further engaged with an intermediate portion of a maim arm which constitutes a parallel link mechanism in association with a slider link, a sub arm and a carriage link mounting a workpiece holder thereon. The slider link, on which the upper end of the main arm is secured, upwardly and downwardly moves with the guidance of a guide member. As separate cam grooves are provided for the work motion and the return motion, the workpiece holder can move in an appropriate route. This enables the continuous operation of the press machine.

8 Claims, 24 Drawing Figures

Fig. 9
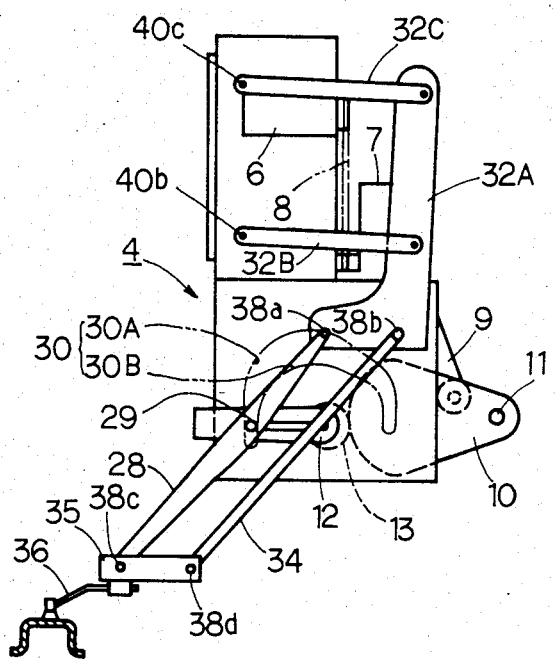
Fig. 10
Fig. 11
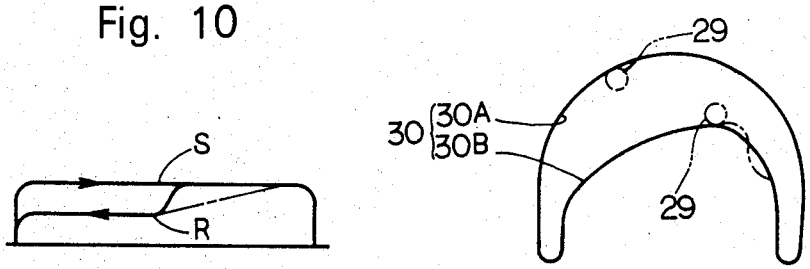

APPARATUS FOR LOADING OR UNLOADING A WORKPIECE

BACKGROUND OF THE INVENTION

The present invention relates to an apparatus for loading or unloading a workpiece, and more particularly, to an apparatus for loading or unloading a workpiece on or from a press die or a jig.

An apparatus for loading or unloading a workpiece has been installed in a press in order to load or unload a workpiece on or from a press die or jig. There has been known such a loading or unloading apparatus as the apparatus can feed a workpiece in not only the horizontal direction but also in the vertical direction. Two kinds of such apparatuses are known. The first kind of apparatus is of a type in which a power source which is common to a manufacturing machine such as a press and to a loading or unloading apparatus, is provided to obviate the temporary stoppage of operation of the manufacturing machine. The second kind of apparatus is of a type in which power sources are separately provided on a manufacturing machine for deeply drawing a workpiece, and a loading or unloading apparatus in order to obtain an automatic operation. However, according to the second kind of apparatus, a temporary stoppage of operation of the manufacturing machine cannot be obviated.

According to the above-mentioned first kind of apparatus, a workpiece holder performs a work motion and further, a return motion when the apparatus returns to a previous position in order to commence to load or unload a workpiece on a manufacturing machine. FIG. 21 illustrates the work motion and the return motion of the workpiece holder 1 according to a prior art. To start or stop the operation of the apparatus, the apparatus has to be located at one of both ends of the work motion or the return motion. If the apparatus is started or stopped on the way of the work or return motion, the moving speed of the workpiece holder 1 is high, a forced actuation for starting or stopping the operation impairs the endurance of the loading or unloading apparatus. To shorten the time when the workpiece holder 1 does not hit a manufacturing machine, it is necessary to minimize the upward and downward stroke of the loading or unloading apparatus. If the upward and downward stroke of the loading or unloading apparatus is made small, a lifter has to be separately installed for compensating the upward and downward stroke of the loading or unloading apparatus.

On the other hand, according to the above-mentioned second kind of apparatus, the perpendicular position of the workpiece holder 1 before or after the workpiece holder 1 starts or finishes the operation, is relatively positioned at a high point because the working motion is same as the return motion, as shown in FIG. 22. The reference h designates the distance in the perpendicular direction where the workpiece 50 is moved by the work motion or the return motion. The reference H designates a stroke where the press repeatedly moves in the perpendicular direction. As apparent from FIG. 22, the high point of the stroke h is close to the high point of the stroke H. Hence, when a workpiece 50 is loaded on a press die or a jig, a manufacturing machine must be temporarily stopped at its top dead point in order to obviate such as problem as the manufacturing machine strikes against the loading or unloading apparatus. FIG. 24 shows a diagram which illustrates the relation between the press stroke and the crank angle of the press. In FIG. 23, a finished product is unloaded during a time between points A and C. A workpiece is loaded during a time between points B and D. The reference TDP designates a top dead point of the manufacturing machine, and the reference BDP designates a bottom dead point thereof. In FIG. 24, the manufacturing machine stops during a time period between crank angles $CA_1$ and $CA_2$ while the apparatus maintains the position of the top dead point. Thus, the manufacturing machine has to temporarily stop at the tip dead point, and hence, the manufacturing machine intermittently operates. This results in decrease in the manufacturing efficiency and further in the occurrence of the wear of parts employed in the loading or unloading apparatus.

SUMMARY OF THE INVENTION

The present invention was made in view of the foregoing background and to overcome the foregoing drawbacks. It is accordingly an object of this invention to provide an apparatus for loading or unloading a workpiece, which can easily control the trace of a moving workpiece holder and enables a manufacturing machine to operate consecutively.

To attain the above objects, an apparatus for loading or unloading a workpiece to be pressed has cam surfaces for a work motion and a return motion, one of which is a pin which contacts with a biasing force. The pin is slidably mounted within a cylinder device which is rotatably mounted on a main body of the apparatus. Further, the pin fit into an intermediate portion of a main arm to move the intermediate portion of the main arm along one of the cam surfaces. The upper end of the main arm is fixed to a slider link which vertically moves with regard to the main body. The lower end of the main arm is fixed to a carriage link on which a workpiece holder is secured. A sub-arm extends in a parallel relationship with the main arm. The upper and lower portions of the sub-arm are fixed to the slider link and the carriage link, respectively. The combination of the main arm, the slider link, the sub-arm, and the carriage link constitutes a parallel link structure.

According to the apparatus of the present invention, the work motion and the return motion can be independently formed to the preferable shapes. Hence, the smooth continuous operation can be obtained.

BRIEF DESCRIPTION OF THE DRAWINGS

The above objects, features and advantages of the present invention will become more apparent from the following description of the preferred embodiments taken in conjunction with the accompanying drawings, wherein:

FIG. 9 is an enlarged front view of the loading or unloading apparatus in which a pair of parallel links are employed for guiding a slider link in the perpendicular direction;

FIG. 10 is a diagram which illustrates work and return motions of a workpiece holder employed in FIG. 2;

FIG. 11 is an enlarged view of the cam groove employed in the apparatus shown in FIG. 2;

DETAILED DESCRIPTION OF THE PREFERRED EMBODIMENTS

The present invention is described in detail with reference to the accompanying drawings which illustrate different embodiments of the present invention.

Figure 1:
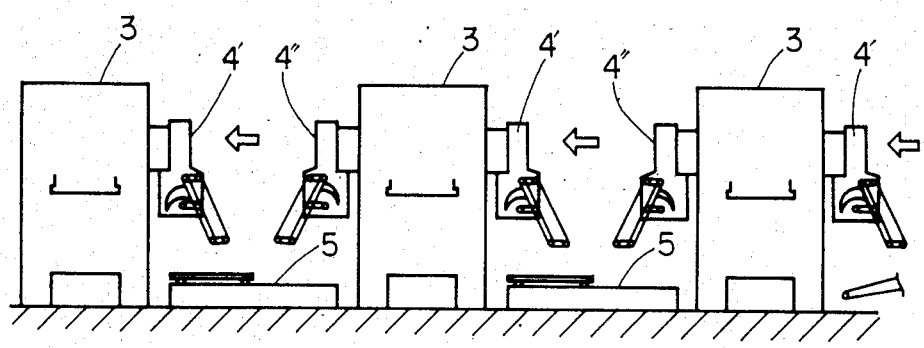
FIG. 1 is a general view of a transfer press line installed with the loading and unloading apparatuses according to the present invention.

Referring to FIG. 1, there is illustrated a general view of a transfer press line. Presses 3 are located in series with a predetermined distance, and loading apparatus 4' are provided at right sides of each press for loading workpieces onto press dies. Unloading apparatuses 4" are provided at the left sides of each press for unloading the finished workpieces from press dies. The numeral 5 designates transfer machines which transfer workpieces to the succeeding press.

Figure 2:
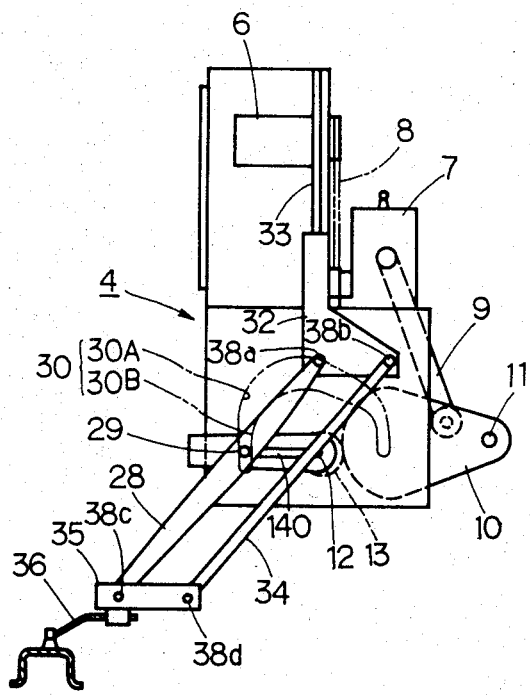
FIG. 2 is an enlarged view of the loading or unloading apparatus employed in the presses shown in FIG. 1.

As shown in FIG. 2, a loading or unloading apparatus includes a motor 6 at its upper portion therein. The motor 6 is synchronized with a rotary power sources (not shown in drawings) of a press or a press ram. A variable speed motor is employed as the motor 6 in this embodiment. The variable speed motor 6 is equipped with a pulse generator for detecting the position of the rotary power sources or the press ram and with a DC generator for detecting the atuating speed of the press ram. Further, there is provided a clutch which is employed at the time for starting the press, and a brake is provided to stop the movement of the loading or unloading apparatus.

Figure 3:
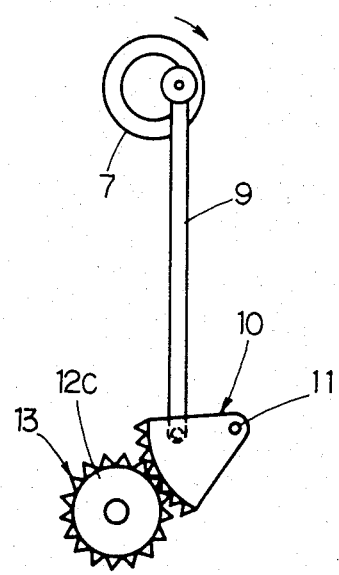
FIG. 3 is a front view of a torque transmitting devices employed in the apparatus in FIG. 2.

A speed reducer 7 is provided under the variable speed motor 6 and includes a crank shaft (not shown in drawings) therein. A timing belt 8 is spanned between an output shaft of the variable speed motor 6 and an input shaft of the speed reducer 7. The belt 8 transmits the rotation of the motor 6 to the speed reducer 7. As shown in FIG. 3, a connecting rod 9 is connected with the crank shaft of the speed reducer 7 at the upper end thereof, and is connected with a back surface of a sector gear 10 at lower end thereof. The sector gear 10 is mounted to rotate repeatedly with a predetermined angle around a pin 11.

A rotation lever 12 is rotatably mounted at the lower part of the loading or unloading apparatus 4. The rotation lever 12 comprises a lever portion 12A shown in FIG. 4 and a rotation shaft portion 12B shown in FIG. 5. The rotation shaft portion 12B extends through the apparatus 4 as shown in FIG. 5 to form an extension portion 12C at the rear side of the apparatus 4. A pinion gear 13 is mounted on the outer periphery of the extension portion 12C of the rotation shaft portion 12B, as shown in FIG. 5. This pinion gear 13 meshes with the sector gear 10 and is rotated by about 180° in the opposite direction to the rotation of the sector gear 10.

Figure 4:
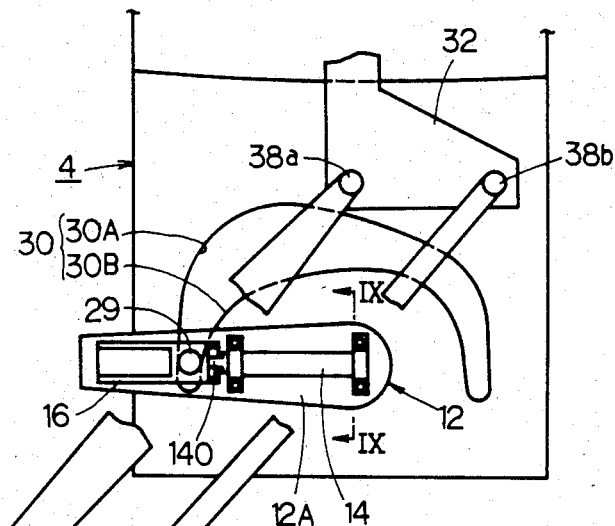
FIG. 4 is an enlarged front view of a rotation lever and an action cylinder device employed in the apparatus in FIG. 2.
Figure 5:
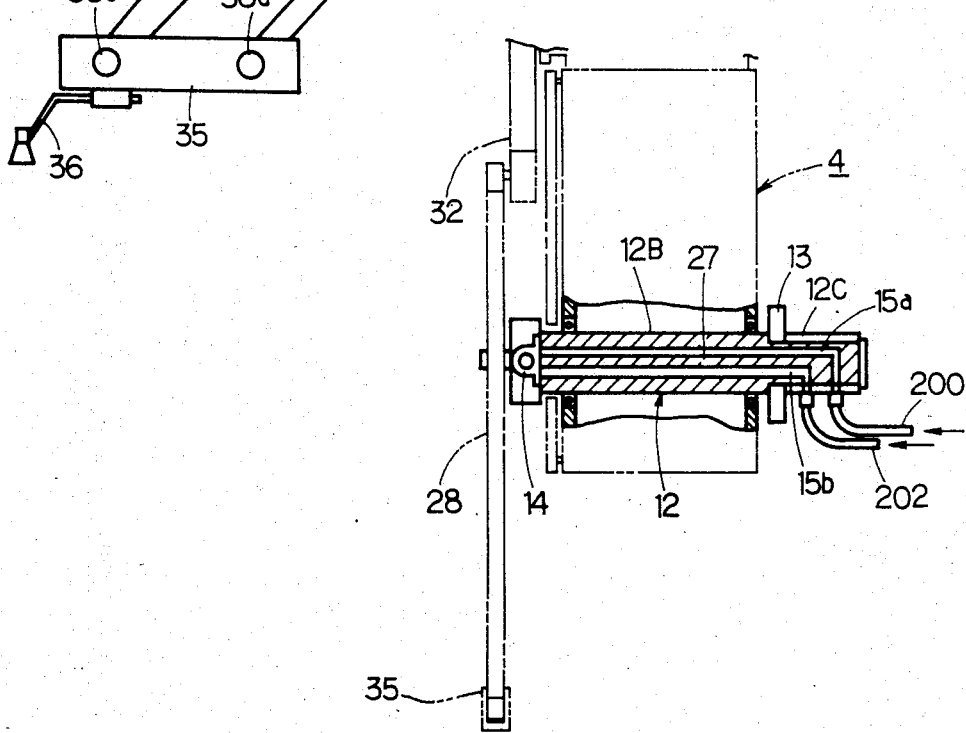
FIG. 5 is a partial cross-sectional view taken along the line IX—IX in the apparatus in FIG. 4.

As shown in FIG. 4, the rotation lever 12 includes a double action type cylinder device 14. A slider 16 is provided within the rotation lever 12 in the condition that the slider 16 slides in the rotation lever 12. When a cylinder rod 140 slides in the longitudinal direction of the cylinder device 14, the slider 16 slides according to the movement of the cylinder rod 140. As shown in FIG. 5, air supply passages 15a and 15b are formed within the rotation shaft portion 12B of the rotation lever 12 in order to supply compressed air into chambers 142 and 146 defined between a piston 144 shown in FIG. 6 and the rotation lever 12.

Figure 6:
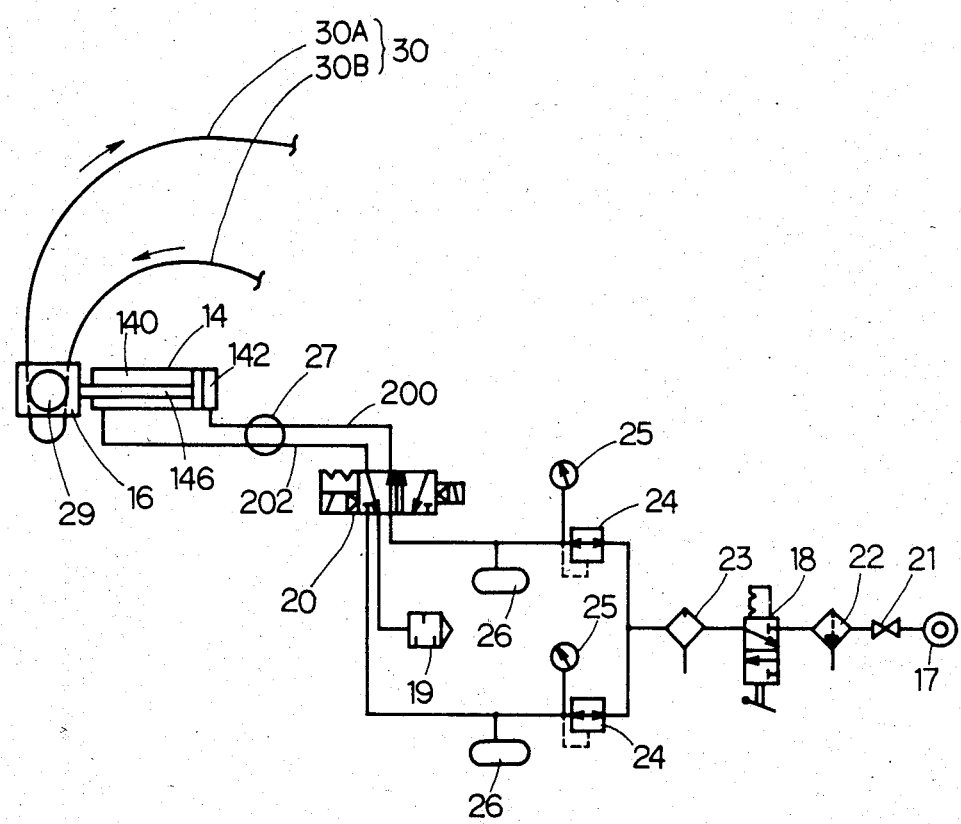
FIG. 6 is a pneumatic circuit diagram of the action cylinder device employed in the apparatus in FIG. 4.

FIG. 6 illustrates a pneumatic circuit diagram of the action cylinder device 14 employed in the apparatus shown in FIG. 4. The compressed air stored in air supply sources 17 is supplied through a manually operated cock 21 and a filter 22 to a starting valve 18. The valve 18 turns on when a main electric power switch turns on. The compressed air is further supplied through a lubricator 23 and a pressure regulator valve 24 to an electromagnetic selector valve 20. The lubricator 23 releases lubricant into the compressed air thereby, generating a mixture. The mixture lubricates moving parts employed in the system. The numeral 25 designates a pressure gauge for detecting the pressure of the supplied mixture. The numeral 26 designates a surge tank located between the pressure regulator valve 24 and the selector valve 20. Finally, the mixture is supplied through a rotary joint 27 into one of the chambers 140 and 142 of the cylinder device 14. The selector valve 20 selects one of the conditions such that the mixture is supplied into the chamber 140 or 142. In FIG. 6, the mixture is supplied into the chamber 140. As the chamber 142 is connected through the selector valve 20 with a silencer 19, the mixture within the chamber 142 is drained to the outside. In this condition shown in FIG. 6, a piston 144 moves to the right by the pressure of the mixture within the chamber 140. A rod 146, which is secured to the piston 144, also moves to the right. Hence, the slider 16 fixed to left end of the rod 146 is forced to move to the right. As a result, the pin 29 contacts a cam groove 30B defined for a return motion. Conversely, when the mixture is supplied into the chamber 142, the pin 29 contacts on a cam groove 30A defined for a work motion.

Figure 7:
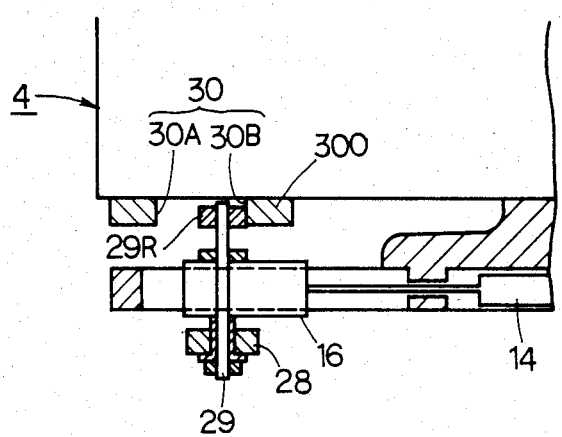
FIG. 7 is a partial cross-sectional view which illustrates the engaged condition between a cam surface and a pin employed in the apparatus in FIG. 2.
Figure 8:
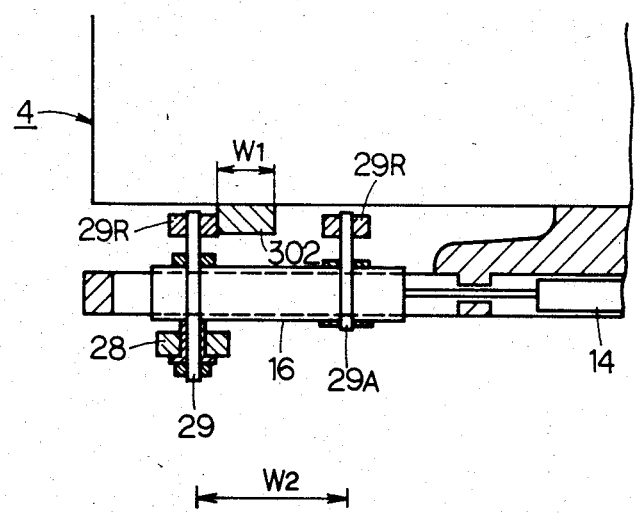
FIG. 8 is a partial cross-sectional view of the loading or unloading apparatus shown in FIG. 2, in which a plate cam is employed instead of the cam groove.

The intermediate portion of a main arm 28 is mounted on the slider 16 to be rotated through the pin 29 with the rotation lever 12, as shown in FIG. 4. One end of the pin 29, as shown in FIG. 7, is provided with a roller 29R, which contacts one of the cam grooves 30A and 30B. The cam groove 30, which is provided in a plate 300 secured to the apparatus 4, is designed to have a configuration such that the pin 29 is required to move therealong. The cam groove 30 comprises the cam groove 30A for a work motion and the cam groove 30B for a return motion. The cam groove 30 is designed to have such a form as the path of the movement of the pin 29 describes a closed loop curve when the rotation lever 12 rotates and further the pin 29 slides in the longitudinal direction of the cylinder device 14. Instead of the plate 300, a plate cam 302 as shown in FIG. 8, may be employed. In the case of the plate cam 302 shown in FIG. 8, another pin 29A is provided in a parallel relationship with the pin 29. One end of the pin 29A is provided with a roller 29R for a smooth movement, through which the pin 29A can contact on the outer periphery of the plate cam 31. The slider 16 can be moved by the operation of the cylinder device 14 in its longitudinal direction. When the roller 29R of the pin 29 contacts on one side of the plate cam 302 as shown in FIG. 8, the pin 29 rotates to achieve a work motion. On the other hand, when the roller 29R of the pin 29A contacts the other side of the plate cam 31, the pin 29 rotates to achieve a return motion. The distance $W_2$ between the pins 29 and 29A is designed to be greater than a width $W_1$ of the plate cam 302 by a predetermined size.

If the work motion of a workpiece holder 36 for grasping a workpiece with a vacuum is the same as the return motion, one of cam grooves 30A or 30B is not necessary to be provided. The upper end of the main arm 28 is fixed by a pin 38a to a lower portion of a slider link 32 which moves in the vertical direction. A guide member 33 extends in the vertical direction, and is fixed to the loading and unloading apparatus 4. The slider link 32 is mounted to slide along the guide member 33. A sub-arm 34 is provided to locate in a parallel relationship with the main arm 28. The upper end of the sub arm 34 is fixed by a pin 38b to the slider link 32. The slider link 32 may be of another construction such as an intermediate link 32A of another embodiment shown in FIG. 9. A pair of parallel links 32B and 32C are fixed by pins 40b and 40c to the loading or unloading apparatus 4. The other ends of the links 32B and 32C are fixed to the intermediate link 32A, respectively. The links 32B and 32C regulate the rightward and leftward movement and the rotational movement of the workpiece within a predetermined scope. The intermediate link 32A regulates the vertical movement of the workpiece.

The lower ends of the main arm 28 and the sub-arm 34 are fixed by pins 38c and 38d respectively to a carriage link 35. A workpiece holder 36 is detachably mounted on the carriage link 35. The workpiece holder 36 grasps a workpiece with the use of a vacuum pressure. The main arm 28, the slider link 32 (32A), the sub arm 34, and the carriage link 35 constitutes a parallel link mechanism. Hence, even when the main arm 28 swings to the direction approaching to a workpiece, the workpiece holder 36 mounted on the carriage link 35 is always maintained to be in the horizontal position.

In operation, when the variable speed motor 6 rotates in the synchronizing relation with the rotary power sources of the press or the press ram, the rotation speed of the variable speed motor 6 is transmitted by the timing belt 8 to the speed reducer 7. The speed reducer 7 reduces the rotation speed of the motor 6 to the predetermined rotation speed. The reduced rotation speed of the speed reducer 7 is further transmitted by the connecting rod 9 to the sector gear 10. The sector gear 10 repeatedly rotates around the pin 11. As the sector gear 10 meshes with the pinion gear 13, the pinion gear 13 rotates repeatedly within an angle of about 180°. Hence, the rotation shaft portion 12B of the rotation lever 12, which is integrally provided with the pinion gear 13, rotates repeatedly with the pinion gear 13. The pin 29, which is provided at the top end of the rotation lever 12, moves while the pin 29 contacts with cam grooves 30A and 30B. The pin 29 is connected with the intermediate portion of the main arm 28. Hence, when the pin 29 moves along the cam grooves 30A and 30B, the main arm 28 also moves with the pin 29. The cylinder device 14 constantly biases the pin 29 toward one of the cam grooves 30A and 30B with an adequate pressure. Hence, the pin 29 can smoothly move along the cam grooves 30A and 30B. Thus, the pin 29 moves so that the pin 29 describes a closed curve while the pin 29 is guided by the cam grooves 30A and 30B. At the same time, the upper end of the main arm 28 repeatedly moves in the only upward and downward direction according to the movement of the slider link 32. When the intermediate portion of the main arm 28 moves along the closed curve, the upper and lower portions of the main arm 28 rotates repeatedly around the pin 29 in the direction for loading or unloading a workpiece. As a result, the workpiece holder 36 mounted on the carriage link 35 moves along the cam grooves 30A for a work motion and 30B for a return motion, thereby generating a work motion S and a return motion R corresponding to the cam grooves 30A and 30B respectively, as shown in FIG. 10. If the configuration of the cam grooves 30A and 30B is altered, the preferred work motion S and return motion R can be set. For example, in the case the cam groove 30B for the return motion R is altered to the configuration having a S shape as shown by one-dot chain line in FIG. 11, the return motion R can be set to have a initial gentle gradient as shown by one-dot chain line shown in FIG. 10.

Figure 21:
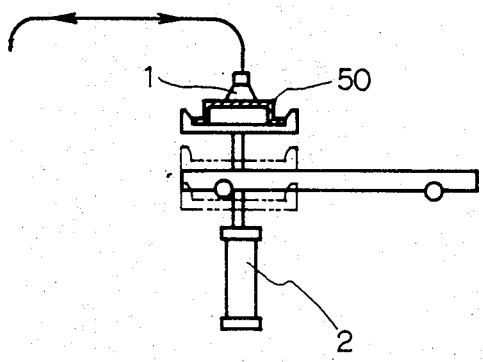
FIG. 21 is a workpiece holder employed in a loading and unloading equipment according to a prior art.
Figure 22:
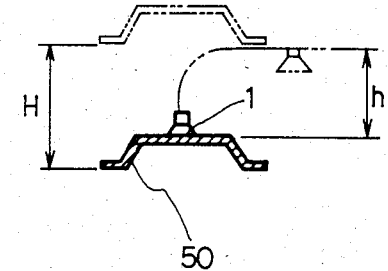
FIG. 22 is a view which illustrates a work motion that a workpiece is loaded on a press die or jig.
Figure 23:
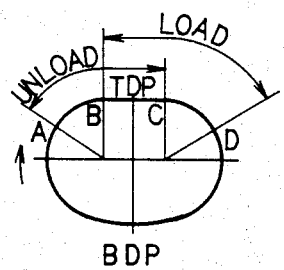
FIG. 23 is a diagram which illustrates the timing of the loading and unloading of the loading or unloading apparatus according to a prior art.
Figure 24:
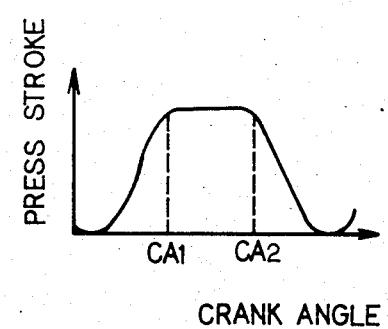
FIG. 24 is a graph which illustrates the relation between the press stroke and the crank angle according to a prior art.

Thus, according to the present embodiment, the workpiece holder 36 can be set so that the workpiece holder 36 can move in the upward and downward direction by the necessary stroke. Hence, a lifter 2 shown in FIG. 21, which compensates the stroke of the workpiece holder in the upward direction, can be obviated.

Figure 12:
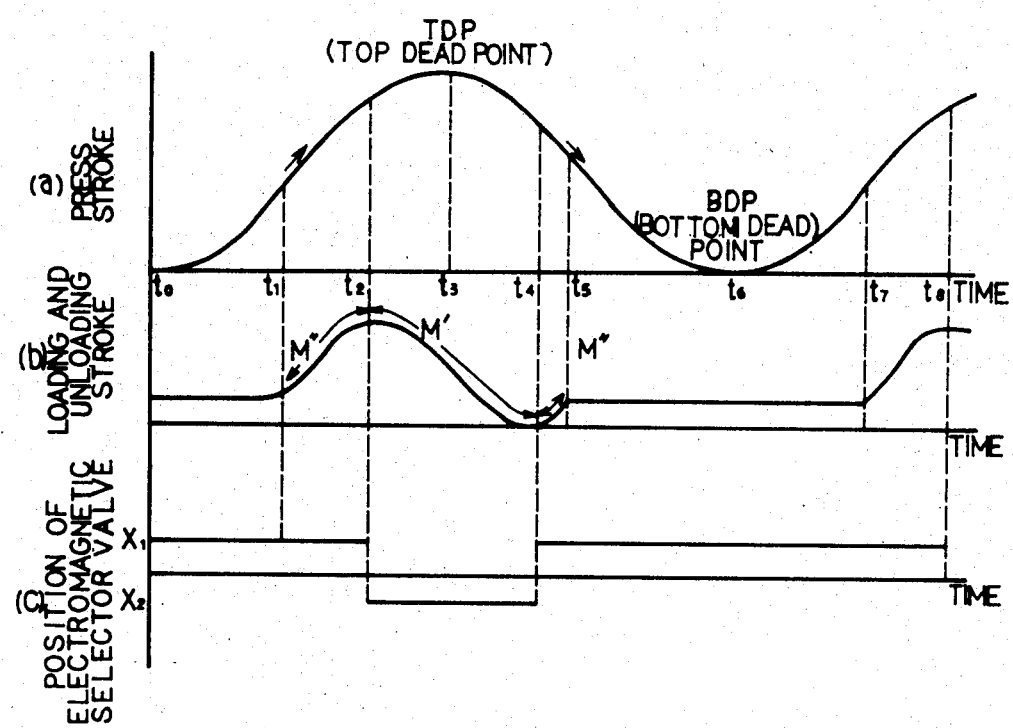
FIG. 12 is a diagram which illustrates the press stroke, the stroke of the loading or unloading apparatus, and the positions of an electromagnetic selector valve.
Figure 13:
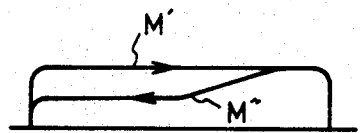
FIG. 13 is a diagram which illustrates another work and return motion of the workpiece holder, according to the present invention.

FIG. 12 illustrates a diagram which illustrates the press stroke, the stroke of the loading or unloading apparatus, and the positions of the electromagnetic selector valve 20 in such a condition as the variable speed motor 6 rotates at a constant speed and the clutch of the loading or unloading apparatus turns on and off. FIG. 13 illustrates motions of the workpiece holder 36 when the pin 29 moves along the cam grooves 30A and 30B shown in FIG. 11. The references M' and M" correspond to the cam grooves 30A and 30B, respectively. In FIG. 12, the press stroke increases during the time period between $t=t_0$ and $t=t_3$. At the time $t_3$, the press stroke reaches to a maximum value at a top dead point of the press. The press stroke decreases during the time period between $t=t_3$ and $t=t_6$. At the time $t_6$, the press stroke reaches to a minimum value at a bottom dead point of the press.

As to the unloading stroke, the references M' and M" shown in FIG. 12(b) corresponds to the motion M' and M" shown in FIG. 13. The apparatus 4 stops at the time period between $t=0$ and $t=t_1$. When the press lifts up by the predetermined stroke, the apparatus 4 commences to actuate the return motion M" as shown in FIG. 13, and operates along a return motion during a time period between $t=t_1$ and $t=t_2$. At the time of $t=t_2$, the motion varies from the return motion M" to the work motion M' and the work motion M' continues during a time period between $t=t_2$ and $t=t_4$. After a workpiece is unloaded on a press die or a jig, the apparatus 4 commences to operate the return motion at the time of $t=t_4$. During the time period between $t=t_5$ and $t=t_7$, the apparatus 4 remains stopped. FIG. 12(c) illustrates the position of the electromagnetic selector valve 20. When the apparatus 4 is in the operation of the work motion M', the electromagnetic selector valve 20 has a stroke $X_2$. In this condition, the mixture is supplied into the chamber 142 shown in FIG. 6 and the mixture in the chamber 140 is drained through the silencer 19 to the outside. On the other hand, when the electromagnetic selector valve 20 is in the condition other than the work motion M', the mixture is supplied into the chamber 140 of the cylinder device 14 as shown in FIG. 6.

Figure 14:
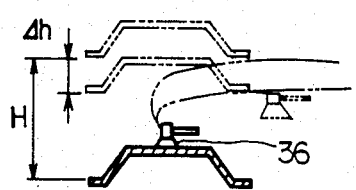
FIG. 14 is a view which illustrates the motion of the workpiece holder, according to the present invention.
Figure 15:
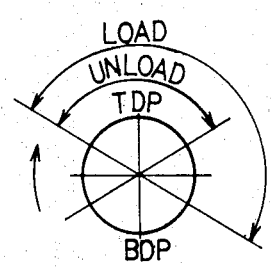
FIG. 15 is a diagram which illustrates the timing of the loading and unloading of the loading or unloading apparatus according to the present invention.
Figure 16:
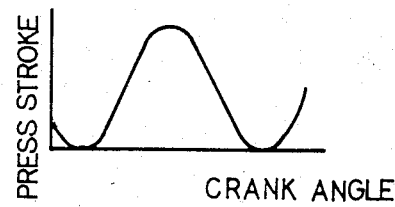
FIG. 16 is a graph which illustrates the relation between the press stroke and the crank angle, according to the present invention.

As shown in FIG. 14, when the workpiece holder 36 is set to have a position lower than the press stroke H by the distance Δh, the scope where the moving press may strike against the loading or unloading apparatus 4 can be small. Hence, the time period when the press stops at the top dead point of the press stroke can be minimum. This enables the smooth and continuous operation of the press.

Further, if the rotation speed of the variable speed motor 6 changes to a low speed or a high speed, the moving speed of the workpiece holder 36 can be controlled to the low speed or the high speed. Hence, the start and stop operation of the loading or unloading apparatus can be obtained at the position on work and return motions.

If the workpiece holder 36 is designed to move at a high speed while the workpiece holder 36 moves onto a press die, and designed to move at a low speed while the workpiece holder 36 moves away from the press die and moves onto the die again, the clutch and brake operation of the loading or unloading apparatus 4 can be obviated. Hence, the endurance of the loading or unloading apparatus 4 is enhanced.

In the above explanation, the unloading operation of the loading or unloading apparatus 4 is mainly employed. Conversely, if the apparatus 4 is employed as a loading apparatus, the electromagnetic selector valve 20 is actuated in the opposite direction to that of the above explanation.

Figure 17:
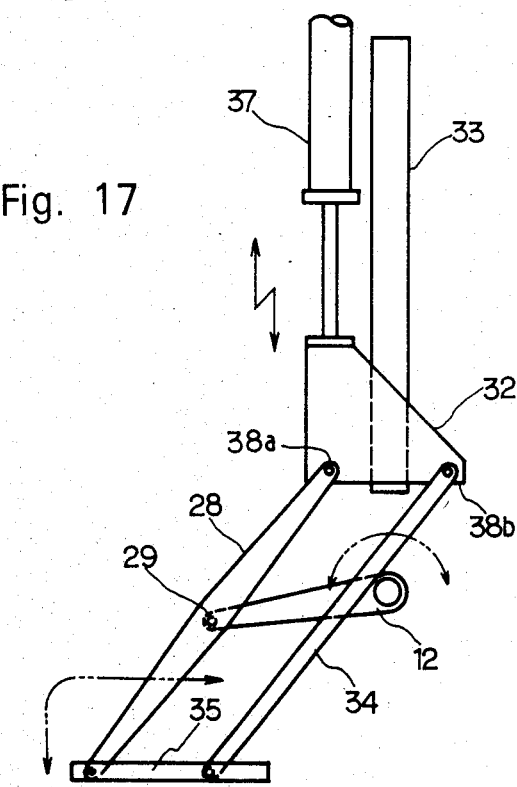
FIG. 17 is a front view of a loading or unloading apparatus according to another embodiment of the present invention.

FIG. 17 illustrates a loading or unloading apparatus according to another embodiment of the present invention. In this equipment, a balance cylinder device 37 is provided and connected with the left upper portion of the slider link 32 in order to generate a balanced force corresponding to the weight of the slider link 32. This reduces the load applied onto an action cylinder device 14 and a small motor, which generates a small output torque, is employed as the power source. The slider link 32 is guided by the guide member 33. This balance cylinder device 37 is secured to the slider link 32 at the position right above the pin 38a which fixes the upper end of the main arm 28 to the slider link 32. In lieu of this, balance cylinder device 37, a spring or a balance weight upwardly biasing the slider link 32 may be employed. The remaining structure of this embodiment is the same as that of the embodiment discussed above.

Figure 18:
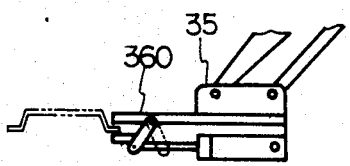
FIG. 18 is a front view of a workpiece holder which consists of gripper jaws.

The vacuum type workpiece holder may be of another type such as that shown in FIG. 18. The workpiece holder shown in FIG. 18 is a gripper jaw 360 mounted on a carriage link 35. The gripper jaw 360 mechanically grasps a workpiece.

Figure 19:
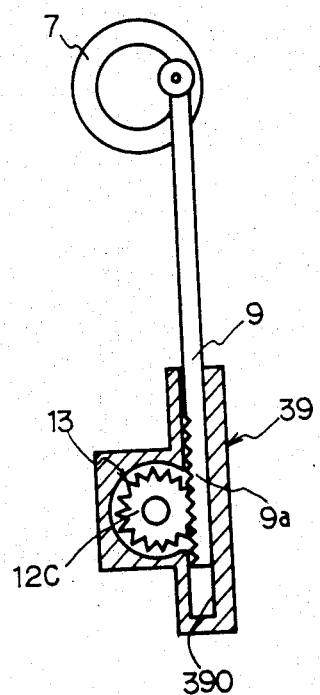
FIG. 19 is a front view of a connecting rod which consists of a rack gear position employed in another embodiment of the present invention.

According to the above embodiments, a sector gear is employed, but the need for the sector gear may be obviated. In this case, as shown in FIG. 19, a connecting rod 9 is provided with a rack gear portion 9a at its lower portion. A pinion gear 13 mounted on a rotation shaft portion 12B meshes with the rack gear portion 9a of the connecting rod 9. A guide block 39 has a perpendicularly extending slot 390, in which the lower portion of the connecting rod 9 extends. The connecting rod 9 is guided by the guide block 39.

The rotation lever is constructed to rotate in a mechanical or electrical synchronizing relation with the power sources of a manufacturing machine. Hence, the rotation lever may be directly rotated by an actuating means such as a rotary cylinder which operates in synchronizing relation with the power sources of the manufacturing machine.

Figure 20:
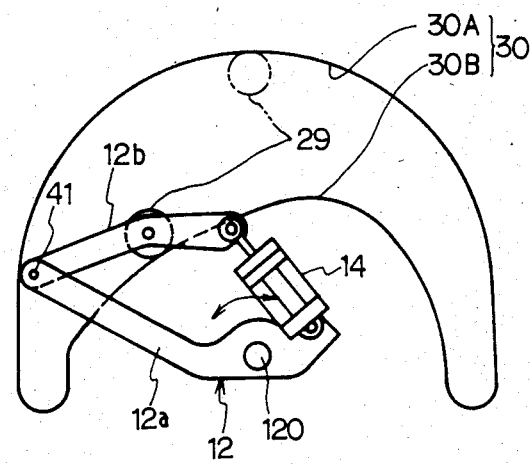
FIG. 20 is a front view of a rotation lever and an action cylinder device according to another embodiment of the present invention.

The rotation lever may be of the type shown in FIG. 20. The rotation lever 12 shown in FIG. 20, comprises a first lever 12a and a second lever 12b which is connected by a pin 41 with one end of the first lever 12 at one end thereof. Further, a cylinder device 14 is provided beween the other ends of the first and second levers 12a and 12b. The other end of the second lever 12b may be provided to extend in the radial direction as to an axis 120 of the rotation lever 12. A pin, which is provided at the intermediate portion of the second lever 12b, contacts with one of the cam grooves 30A and 30B with the biasing force generated by the cylinder device 14.

In the above-described embodiments, it is not necessary to vary the rotation speed of the variable speed motor within one cycle. Hence, a constant speed motor may be employed instead of a variable speed motor.

While the present invention has been described in its preferred embodiments, it is to be understood that the invention is not limited thereto, and may otherwise be embodied within the scope of the following claims.

What is claimed is:

1. An apparatus for loading or unloading a workpiece comprising:
   a main body;
   power sources provided on said main body for generating a rotary movement;
   rotating means cooperatively connected with said power sources so as to be rotated in accordance with the rotary movement of said power sources and rotatably mounted on said main body, the rotating means comprising a cylinder device which slides in a longitudinal direction thereof, a pin means which is actuated by the sliding movement of a rod of said cylinder device, and a biasing means biasing said pin means toward one of two different positions;

cam means provided onto said main body, the cam means having a first cam surface for a work motion and a second cam surface for a return motion, said pin means contacting on one of the first and second cam surfaces with the force of said biasing means;

a workpiece holder for holding a workpiece;

carriage means mounting said workpiece holder thereon;

guide means fixed on said main body and extending in a vertical direction;

a sliding means sliding in a parallel direction with the guidance of said guide means;

a main arm whose upper portion is pivotally mounted on said sliding means and whose lower portion is pivotally mounted on said carriage means, said pin means pivotally fitting into an intermediate portion of said main arm to move the intermediate portion of said main arm; and a sub-arm extending in a parallel relationship with said main arm, an upper portion of said sub-arm pivotally mounted on said sliding means, a lower portion of said sub-arm pivotally mounted on said carriage means, the combination of said main arm, said sliding means, said sub-arm and said carriage means constituting a parallel link structure, whereby when the power sources commence to generate a rotary movement, the rotating means rotates according to the rotary movement of the power sources while the pin means contacts on one of the first and second cam surfaces with the force of the biasing means, thereby obtaining a work motion and a return motion which is different from a work motion of a workpiece.

2. The apparatus of claim 1, further comprising:

a speed reducer for reducing the rotation speed of said power sources;

a first torque transmitting means for transmitting the rotation speed of said power sources to said speed reducer; and a second torque transmitting means for transmitting the reduced rotation speed of said speed reducer to said rotating means.

3. The apparatus of claim 2, wherein said second torque transmitting means comprises a connecting rod whose one end is connected to an output of said speed reducer in such a condition as the connecting rod rotates with the output of said speed reducer, a sector gear connected with said connecting rod at another end of said connecting rod and rotated according to the movement of said connecting rod, and a pinion gear meshing with said sector gear and secured to said rotating means.

4. The apparatus of claim 1, wherein said cylinder device has a piston connected through said rod with said pin and chambers separated by the piston within said cylinder device, into one of which a fluid is supplied for biasing said pin means on one of said first and second cam surfaces.

5. The apparatus of claim 1, wherein said cam means is a plate fixed onto said main body, said plate having an opening which forms said first cam surface for a work motion and a second cam surface for a return motion.

6. The apparatus of claim 5, wherein said pin means contacts on one of said first and second cam surfaces through a roller secured onto said pin means.

7. The apparatus of claim 1, wherein said pin means comprises two pins extending in a parallel relationship with each other and said cam means being a plate fixed onto said main body, and outer periphery of said plate forming said first and second cam surfaces on which one of said pins contacts with the force of said biasing means.

8. The apparatus of claim 7, wherein said pins have rollers, and said pins contact through the rollers to said cam surfaces.

* * * * *